(12) United States Patent
Elbadawy

(10) Patent No.: US 10,513,918 B2
(45) Date of Patent: Dec. 24, 2019

(54) METHODS AND SYSTEMS FOR INTERVENTION LESS WELL MONITORING

(71) Applicant: Vertice Oil Tools, Missouri City, TX (US)

(72) Inventor: Hossam Elbadawy, Katy, TX (US)

(73) Assignee: Vertice Oil Tools, Missouri City, TX (US)

( * ) Notice: Subject to any disclaimer, the term of this patent is extended or adjusted under 35 U.S.C. 154(b) by 154 days.

(21) Appl. No.: 15/728,594

(22) Filed: Oct. 10, 2017

(65) Prior Publication Data
US 2019/0106983 A1   Apr. 11, 2019

(51) Int. Cl.
| G01F 1/704 | (2006.01) |
| E21B 47/10 | (2012.01) |
| E21B 43/26 | (2006.01) |

(52) U.S. Cl.
CPC .......... *E21B 47/1015* (2013.01); *G01F 1/704* (2013.01); *E21B 43/26* (2013.01)

(58) Field of Classification Search
CPC ...... E21B 47/1015; E21B 43/26; E21B 34/14; E21B 2034/007; E21B 31/12; E21B 47/09; E21B 47/102; E21B 47/12; E21B 43/2677; G01F 1/704; C09K 8/80

See application file for complete search history.

(56) References Cited

U.S. PATENT DOCUMENTS

| 8,596,354 B2 | 12/2013 | Hartshorne et al. | |
| 9,638,024 B2 | 5/2017 | Kilaas | |
| 2003/0131991 A1 | 7/2003 | Hartog | |
| 2008/0236257 A1 | 10/2008 | De Jonge | |
| 2013/0126158 A1 | 5/2013 | Gupta et al. | |
| 2014/0231071 A1* | 8/2014 | Walton | E21B 47/1015 166/250.01 |
| 2016/0075941 A1* | 3/2016 | Duenckel | C09K 8/805 166/280.2 |
| 2016/0201454 A1* | 7/2016 | Nyhavn | E21B 27/02 73/152.51 |

FOREIGN PATENT DOCUMENTS

| WO | WO2012177147 | 4/2013 |
| WO | WO2016172212 A1 | 10/2016 |

* cited by examiner

*Primary Examiner* — Lisa M Caputo
*Assistant Examiner* — Brandi N Hopkins
(74) *Attorney, Agent, or Firm* — Pierson IP, PLLC

(57) ABSTRACT

A cartridge with a permeable material configured to be positioned within a frac sleeve, wherein the permeable material is or includes a tracer.

2 Claims, 3 Drawing Sheets

METHODS AND SYSTEMS FOR INTERVENTION LESS WELL MONITORING

BACKGROUND INFORMATION

Field of the Disclosure

Example of the present disclosure relate to intervention less well monitoring. More specifically, embodiments are directed towards positioning a cartridge with tracers within a frac sleeve or similar downhole device to monitor a well.

Background

Hydraulic fracturing is the process of creating cracks or fractures in underground geological formations. After creating the cracks or fractures, a mixture of water, sand, and other chemical additives, are pumped into the cracks or fractures to protect the integrity of the geological formation and enhance production of the natural resources. The cracks or fractures are maintained opened by the mixture, allowing the natural resources within the geological formation to flow into a wellbore, where it is collected at the surface.

During and after the fracturing process, it is necessary to monitor the well to determine the pressure, flow rate, etc. of resources flowing from or into the geological formation. Conventionally, radioactive tracers or other types of tracers are injected into the fracturing fluid to determine an injection profile and location of created fractures. However, these conventional systems do not allow monitoring for clusters or stages of well due to poor placement or due to contamination with other fluid from other stages that makes it difficult to correlate tracers to particular zones or due to the tracer particles breaking out of the fluid and staying in the formation.

Other conventional systems to monitor wells include positioning fiber-optic cables outside of a casing. Using the fiber optics, temperatures can be measured along the well. By monitoring the temperature of the well, engineers can determine how much fracking fluid different parts of the well use, and a quantity of resources being produced. However, using fiber-optic cables requires additional materials to be inserted and installed into a well bore. Further, if a section of the fiber-optic cables become damaged, it is impossible to get any data from the entire cable.

Accordingly, needs exist for system and methods utilizing frac-sleeves or similar devices positioned throughout a well, wherein cartridges with tracers are positioned at different stages. The cartridges are configured to allow fluid to flow through them, allow the tracers to be produced along with fluid, and measured on the surface to identify which clusters are producing. In the same time if the stage is not producing, then the tracer will not be in direct contamination with wellbore fluid produced from other stages.

SUMMARY

Embodiments disclosed herein describe a cartridge with a permeable material configured to be positioned within a frac sleeve, wherein the permeable material includes a tracer. More specifically, embodiments include a plurality of cartridges with tracers, each having a unique identifier positioned at different clusters with different sleeves through an entire well. In embodiments, fluid may be configured to flow from a formation, through an inlet positioned in an annulus, into the cartridge, through or around the permeable material with the tracer with the unique identifier, into an outlet, through the inner diameter of the tool, and to the surface. At the surface, the fluid with tracers can be analyzed to determine which clusters are producing.

Embodiments may include a well with a plurality of clusters, which may each include a plurality of frac sleeves, and a cartridge configured to be positioned within each frac sleeve.

The cartridge may include an inlet, tracer shaped into permeable material, and outlet.

The inlet may be an opening within the cartridge that is configured to receive fluid from the formation. In embodiments, the inlet may be facing an annulus between the frac sleeve and casing.

The permeable material may be positioned between the inlet and the outlet with the cartridge. The permeable material may be any type of porous material that is configured to allow fluid and other materials to flow through and around the permeable material. The permeable material may include tracers that are configured to be unique identifiers that are configured to be produced with the fluid and measured on the surface to identify the clusters that are producing.

The tracers may be chemical tracers, DNA tracers, radioactive tracers, nano-particles, or any other type of material that creates a unique identifier that can flow with produced fluid. In embodiments, each cartridge that is associated with a different cluster in the well may include a different tracer with a different unique identifier. Accordingly, a first frac sleeve may include a first tracer with a first unique identifier, and a second frac sleeve may include a second tracer with a second unique identifier, wherein the first unique identifier and the second unique identifier are different. In embodiments, the tracer material may be configured to only be released if production fluid interacts with the permeable material.

The outlet may be configured to receive fluid that has interacted with the permeable material to receive the tracers, and allow the fluid to enter the inner diameter of the tool. In embodiments, the outlet may be positioned on an opposite side and end of the cartridge than the inlet. For example, the outlet and the inlet may be longitudinally and laterally offset from each other, and the outlet and the inlet may be positioned one hundred eighty degrees from each other. In embodiments, the inlet may be positioned further down hole from the inlet, whereas in other embodiments, the outlet may be positioned further down hole than the inlet.

In embodiments, responsive to the production fluid flowing into the cartridge via the inlet, through the permeable materials with the tracers, and out of the cartridge through the outlet, the production fluid with the tracers may flow through the inner diameter of the tool to the surface. On the surface, the produced fluid may be sampled and analyzed to determine what tracers are within the produced fluid to determine which zones are producing and/or to estimate the production from each zone.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
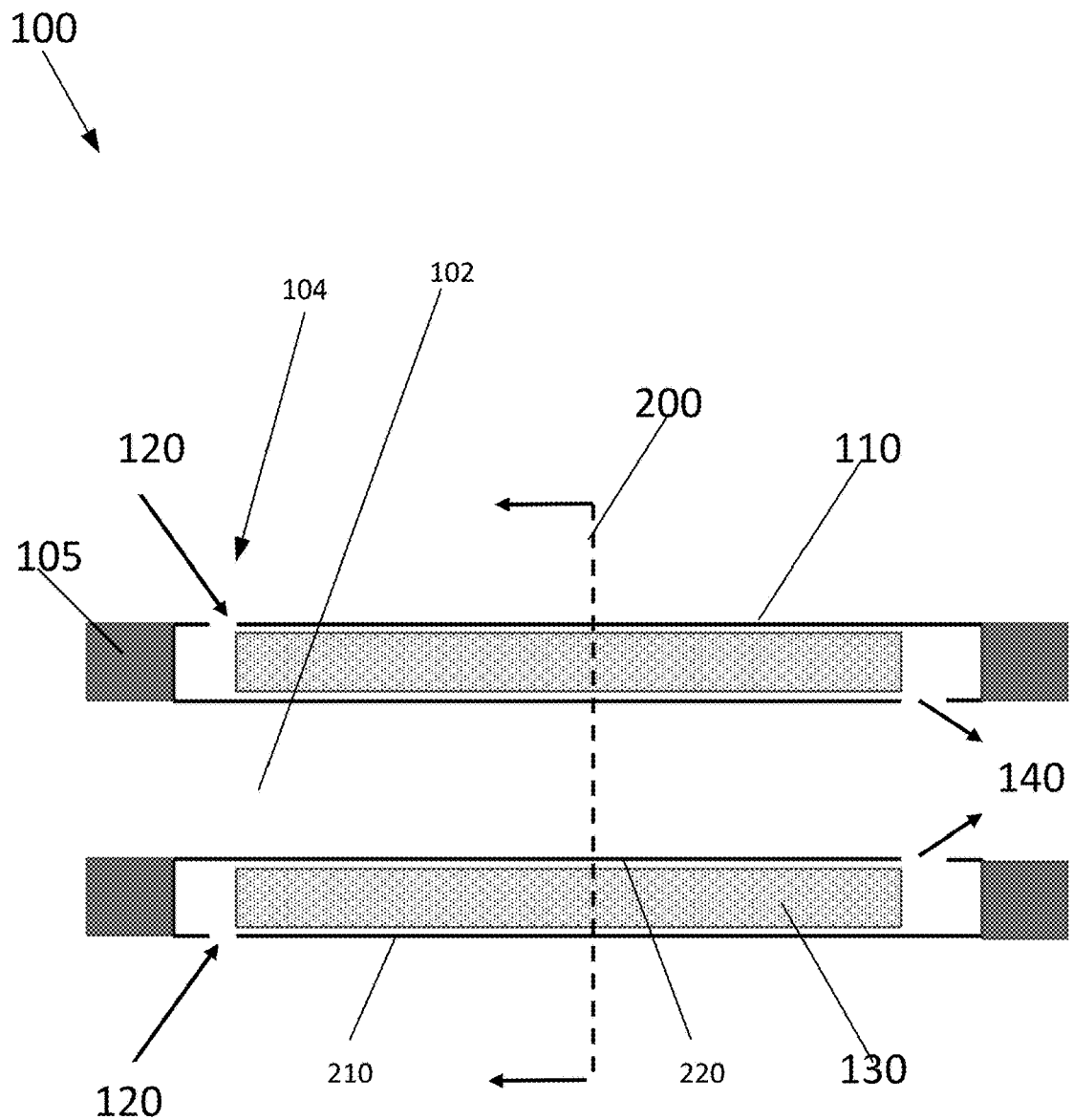
FIG. 1 depicts a cartridge that is configured to be positioned within a sleeve, tool, etc., according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Examples of the present disclosure relate to a cartridge with a tracer that is configured to be positioned within a frac sleeve.

Turning now to FIG. 1, FIG. 1 depicts a cartridge 100 that is configured to be positioned within a frac sleeve 105, tool, etc., according to an embodiment. In embodiments, each stage or cluster of stages of a wellbore may include a cartridge 100. Cartridge 100 may include a housing 110, inlet 120, permeable material 130, and outlet 140.

Housing 110 may be a removable container, vessel, etc. with a hollow inner chamber configured to receive fluid from an inner diameter 102 of frac sleeve 105 or an outer diameter 104 of frac sleeve 105, allow fluid to flow through housing 110, and dispense fluid to the outer diameter 104 or inner diameter 102 of frac sleeve 105. In embodiments, housing 110 may be inserted within any desirable flow path in a wellbore system between an inlet 120 and outlet 140 of the system. Alternatively, housing 110 may be directly embedded within the sidewalls of a tool. Housing 110 may include closed distal and proximal ends, and create, such that fluids may only enter or the hollow chamber via inlet 120 and outlet 140.

Inlet 120 may be an opening within a sidewall of housing 110 on an outer circumference 210 of cartridge 100. Inlet 120 may be positioned to face an outer diameter 104 of frac sleeve 105 or an inner diameter 102 of frac sleeve 105. In embodiments, inlet 120 may be configured to receive production fluid that has entered a frac sleeve, or production fluid that is positioned within an annulus, wherein the annulus is positioned between the sidewall of a tool and casing. Through inlet 120, the production fluid may be configured to enter the hollow chamber between the proximal and distal end of housing 110.

Permeable material 130 may be positioned in the hollow chamber between inlet 120 and outlet 140. Permeable material 130 may be any type of porous material that is configured to allow fluid and other materials to flow through and around the permeable material 130. Permeable material 130 may formed entirely from and/or include tracers that are unique identifiers that are configured to be produced, emitted, bonded to, etc. the production fluid responsive to the production fluid flowing through or around permeable material 130. In embodiments, each different cartridge 100 or cartridges associated with different zones or clusters 100 may each have tracers with different unique identifiers.

The tracers and the production fluid may measure on the surface to identify the frac sleeve 105, clusters of frac sleeves, zone associated with frac sleeve 105 that are producing fluid that went through cartridge 100. The tracers may be chemical tracers, DNA tracers, radioactive tracers, nano-particles, or any other type of material that creates a unique identifier that can flow with produced fluid. In embodiments, each cartridge 100 that is associated with a different cluster in the well may include a different tracer with a different unique identifier. Accordingly, a first frac sleeve 105 may include a tracer with a first unique identifier, and a second frac sleeve 105 may include a tracer with a second unique identifier, wherein the first unique identifier and the second unique identifier are different. In embodiments, the tracer material may be configured to only be released if production fluid interacts with the permeable material 130.

Outlet 140 may be an opening within a sidewall of housing 110 on an inner circumference 220 of cartridge 100. Outlet 140 may be positioned to face an outer diameter 104 of frac sleeve 105 or an inner diameter 102 of frac sleeve 105, wherein outlet 140 and inlet 120 are positioned on opposite sides of the hollow chamber. Accordingly, if inlet 120 is configured to receive production fluid from the annulus, then outlet 140 may be configured to communicate the production fluid to the inner diameter 102 of the frac sleeve 105. Furthermore, outlet 140 and inlet 120 may be vertically offset from each other. Therefore, outlet 140 may be positioned further down hole from inlet 120, whereas in other embodiments, outlet 140 may be positioned further down hole than inlet 120.

Responsive to the production fluid flowing into cartridge 100 via the inlet 120, which may be positioned on either the inner diameter 102 of the frac sleeve 105 or outer diameter of frac sleeve 105, the production fluid may enter the hollow chamber cartridge. Due to pressure of the production fluid, the production fluid may flow from inlet 120 to outlet 140, wherein the production fluid may traverse perm permeable material 130 with the tracers, and exit cartridge 100. Next, the production fluid with the tracers may flow through the inner diameter of the tool to the surface. On the surface, the produced fluid may be sampled and analyzed to determine what tracers are within the produced fluid. The tracers may then be determined based on the unique identifiers associated with the corresponding cartridges to determine which zones are producing and/or to estimate the production from each zone.

Figure 2:
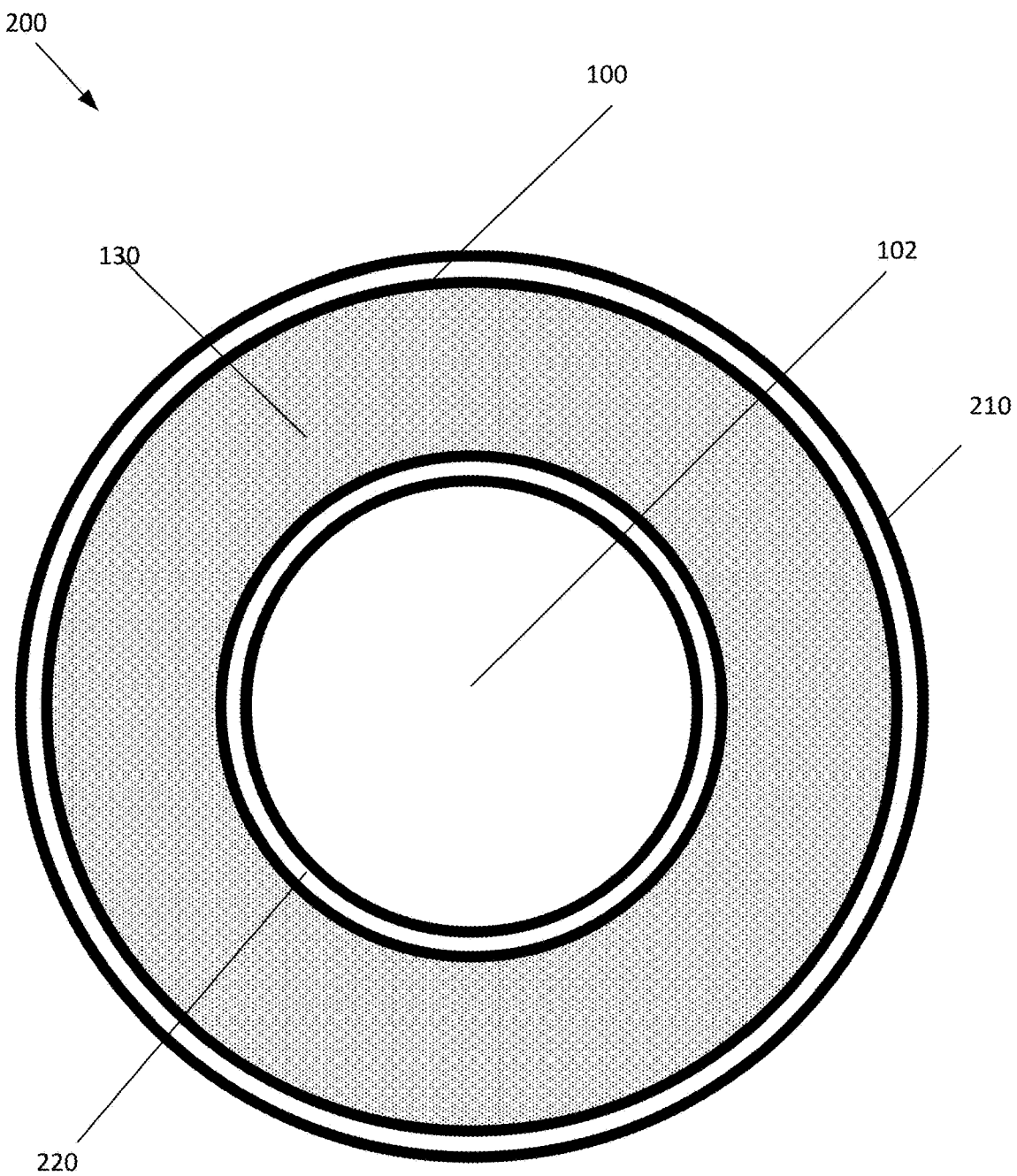
FIG. 2 depicts a cross section of a cartridge, according to an embodiment.

FIG. 2 depicts a cross section 200 of cartridge 100, according to an embodiment. Elements depicted in FIG. 2 may be described above. For the sake of brevity, another description of these elements is omitted.

As depicted in FIG. 2, cartridge 100 may be substantially cylindrical in shape with an outer circumference 210 that includes an inlet 120, and an inner circumference 220 that includes an outlet 140. In embodiments, permeable material 130 may be positioned between the outer diameter 210 and the inner diameter 220.

Figure 3:
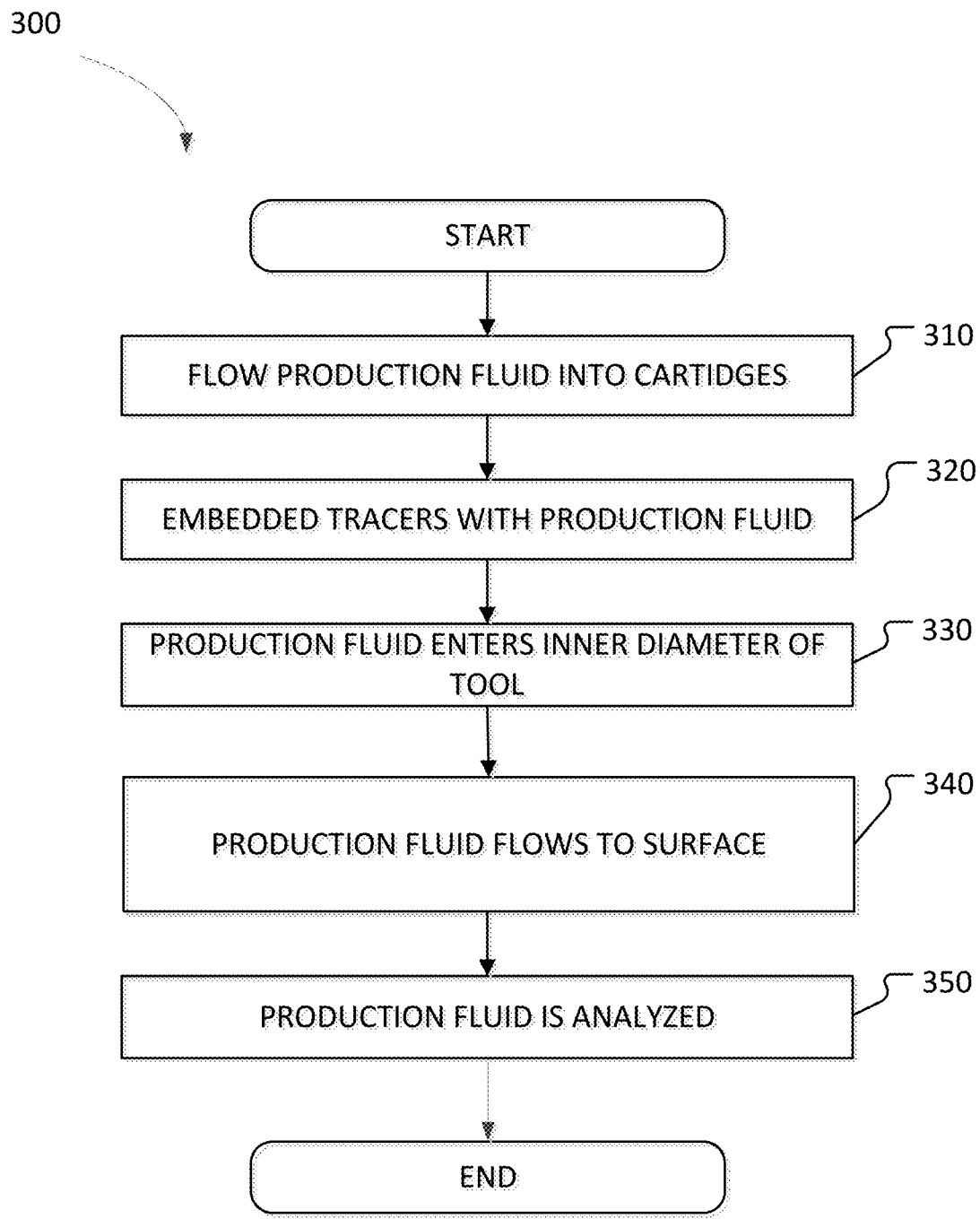
FIG. 3 depicts a method for utilizing a frac sleeve with a cartridge, according to an embodiment.

FIG. 3 depicts a method 300 for utilizing a frac sleeve with a cartridge, according to an embodiment. The operations of the method depicted in FIG. 3 are intended to be illustrative. In some embodiments, the method may be accomplished with one or more additional operations not described, and/or without one or more of the operations discussed. Additionally, the order in which the operations of the method are illustrated in FIG. 3 and described below is not intended to be limiting. Elements depicted in FIG. 3 may be described above. For the sake of brevity, a further description of these elements is omitted.

At operation 310, first production fluid may flow through an inlet of a first cartridge positioned at a first stage in a wellbore, second production fluid may flow through a second inlet of a second cartridge positioned at a second stage in a wellbore, and third production fluid may not flow through a third inlet of a third cartridge positioned at a third stage in a wellbore.

At operation 320, the first production fluid may flow through and/or around first permeable material within the first cartridge. Responsive to the first production fluid interacting with the first permeable material, first tracers may be embedded within the first production fluid. Simultaneously, the second production fluid may flow through and/or around second permeable material within the second cartridge. Responsive to the second production fluid interacting with the second permeable material, second tracers may be embedded within the second production fluid. Additionally, the third production fluid may not interact with third tracers positioned with the third cartridge because the third section of the well may not be producing.

At operation 330, the first production fluid may enter an inner diameter of a tool at a first location via a first outlet associated with the first cartridge. The second production fluid may enter the inner diameter of a tool at a second location via a second outlet associated with the second cartridge.

At operation 340, the first production fluid and the second production fluid may flow through the inner diameter of the tool to a surface of the wellbore.

At operation 350, the total production fluid including the first production fluid with the first tracer and the second production fluid with the second tracer may be analyzed based on the tracers within the production fluid. The tracers within the total production fluid may be analyzed to determine that 1) the third tracer is not present within the total production fluid, thus the third section of the well is not producing, 2) determine a ratio of the first tracers to the second tracers to estimate the relative production from each section, 3) determine a quantity of the first tracers and the second tracers to estimate the production from each zone.

In certain embodiments, a frac sleeve may be positioned within an inner diameter of tool, wherein an annulus may be positioned an outer diameter of a tool and a casing in the wellbore. Production fluid flows into a production port positioned through the outer diameter of tool, into cartridge 100, through the permeable material 130, out of cartridge 100, and into the inner diameter of the tool via sleeve ports that extend into the inner diameter of the tool.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for intervention less well monitoring comprising:
   interfacing a first cartridge with a first frac sleeve, the cartridge including an inlet positioned on a first side of the first cartridge and an outlet positioned on a second side of the first cartridge;
   positioning a permeable material in the first cartridge between the inlet and the outlet, the permeable material including a first tracer having a first unique identifier;
   embedding the first tracer within the first production fluid responsive to the first production fluid flowing from the inlet to the outlet;
   positioning a second cartridge at a different stage of the well, the second cartridge including a second tracer having a second unique identifier, wherein the second tracer is embedded within second production fluid responsive to the second production fluid flowing through the second cartridge;
   combining the first production fluid and the second production fluid within an inner diameter of a tool.

2. The method of claim 1, further comprising:
   determining a first level of production of a first stage associated with the first cartridge is based on an amount of the first tracer within the combined first production fluid and the second production fluid.

* * * * *